United States Patent
Kalmanash

Patent Number: 5,982,090
Date of Patent: Nov. 9, 1999

[54] INTEGRATED DUAL MODE FLAT BACKLIGHT

[75] Inventor: Michael H. Kalmanash, Los Altos, Calif.

[73] Assignee: Kaiser Aerospace and Electronics Coporation, San Jose, Calif.

[21] Appl. No.: 08/944,854

[22] Filed: Oct. 6, 1997

Related U.S. Application Data

[60] Provisional application No. 60/052,220, Jul. 11, 1997.

[51] Int. Cl.$^6$ ........................................... H01J 5/16
[52] U.S. Cl. ............................ 313/493; 313/582; 313/620; 362/31
[58] Field of Search ..................................... 313/493–581, 313/582, 609, 620; 362/26, 31

[56] References Cited

U.S. PATENT DOCUMENTS

| | | | |
|---|---|---|---|
| 4,920,298 | 4/1990 | Hinotani et al. ........................ | 313/493 |
| 5,211,463 | 5/1993 | Kalmanash ................................. | 362/26 |
| 5,466,990 | 11/1995 | Winsor ..................................... | 313/493 |

*Primary Examiner*—Michael Day
*Attorney, Agent, or Firm*—Marvin H. Kleinberg, Esq.; Kleinberg & Lerner, LLP

[57] ABSTRACT

An integrated dual day night backlight includes a flat channel light source with an auxiliary night light source suitably filtered to remove infrared components from the illumination. In alternative embodiments, the night light can be a separate bulb or it can be separate light channels within the flat channel source. The night illumination is directed through the edge of the light transmissive face plate that covers the main or day channel. The light directing means can be an inner reflecting surface of the face plate or can be a separate reflective element that redirects the illumination from the night channel through the edge of the transmissive face plate.

13 Claims, 7 Drawing Sheets

INTEGRATED DUAL MODE FLAT BACKLIGHT

This is a continuation-in-part of my copending provisional application Ser. No. 60/052,220, filed Jul. 11, 1997.

BACKGROUND OF THE INVENTION

1. Field of the Invention

The present invention relates to display devices and, more particularly, a source of illumination for liquid crystal displays.

2. Background

Liquid crystal devices (LCDs) function as effective modulators of light, so that displays based on these devices require a separate source of luminance. Transmissive LCD displays use an integral backlight placed behind the LCD. These backlights usually fall into one of two generic types.

Edgelit lightpipes are used in applications such as notebook computers, where backlight depth is a premium parameter, and high luminance is not required. Direct backlit LCDs, using lamps mounted in a reflector housing and behind a diffusing screen (to hide the lamp shape), are used where high luminance is more important. These systems are usually somewhat bulkier than those using edgelit lightpipes.

Fluorescent lamps are commonly used as the illumination source in LCD backlights, since they have the requisite properties of high efficiency, long life and good color balance. Small diameter straight fluorescent tubes are often used as the edgelight illuminators, and single or multiple straight or serpentine fluorescent tubes are used as the direct backlight illuminators.

In this latter case, increasing the number of lamps and/or incorporating longer serpentine lamp lengths (more channel "legs") increase light output and uniformity (thereby permitting thinner structures). On the downside, greater numbers of lamps increase driver complexity and cost, and increased serpentine lamp length reduces dimming range.

Fluorescent lamps are filled with a mixture of an inert gas (typically Argon) and Mercury vapor, at low pressure. Electrons emitted by the lamp cathodes are used to ionize the gas, and a drive waveform applied to the electrodes causes a net charge transport through the lamp medium (current flow).

The Mercury vapor ions radiate in the ultraviolet (UV) and it is this UV radiation which excites the lamp phosphors, causing them to emit light in the visible spectrum. Lamp luminance is typically controlled either by varying the frequency of the drive waveforms to control the net current flow, or by varying the conduction duty cycle by controlling the energy in each drive pulse.

In any case, uniform emission is difficult to maintain over a very wide dimming range (particularly at low luminance levels). This problem is worse for longer arc path lengths.

Dimming is not usually a major concern for LCDs intended for indoor or office applications, or other controlled ambients. It becomes increasingly important for outdoor applications such as ATM machines, or for cars, aircraft or other vehicles where the display is likely to be viewed under conditions ranging from bright sunlight to total darkness. By far the most demanding application in terms of dimmability is in the cockpits of tactical military aircraft, where a dimming range in excess of 4000:1 is usually required.

While techniques for dimming fluorescent lamps are well known, the ability to maintain a stable uniform luminance output at extremely low luminance levels is an intrinsic limitation of the fluorescent lamp technology, and one which is further complicated by long arc channel lengths.

DESCRIPTION OF THE RELATED ART

Recently, a number of vendors (including Flat Candle, Colorado Springs, Colo.; Winsor Corp, Seattle, Wash.; and Thomas Electronics, Wayne, N.J.) have begun manufacturing flat channel fluorescent lamps, where the tubular cavity needed to contain the fluorescent gas mixture is molded, cast or etched into a first substrate, which is then sealed to a second, flat substrate.

The substrates are coated with phosphor and/or reflective layers before sealing, and the sealed cavity is filled with a gas mixture similar to that of conventional fluorescent tubes. One such flat channel lamp is described by Honotani, et al (U.S. Pat. No. 4,920,298).

These flat channel lamps have the advantage of ease of manufacturing, particularly for very long or complex channel shapes where it would be difficult to bend or shape conventional fluorescent tubes. Such long channels provide improved uniformity and efficiency, and reduced thickness, important parameters in many LCD systems. Very long arc channels, however, tend to reduce the dimming range achievable without introducing instabilities and nonuniformities in the lamp emission.

One way to provide the wide dimming range required for compatibility with a wide range of viewing ambients is to use a dual (day/night) lamp architecture, with a first lamp providing a high intensity luminance range to cover daytime viewing ambients and a second lamp providing a low intensity luminance range for night time ambients. Some overlap between day and night ranges is typically provided, so that in a backlight required to operate from 1 fL to 4000 fL, for example, the Day dimming range might be 20 fL to 4000 fL and the Night dimming range might be 1 fL to 100 fL.

PRIOR ART

A review of the relevant prior art has called attention to the following prior art references:

REFERENCES

1. Hehr. "Large Area Light Source". U.S. Pat. No. 4,277,817.
2. Hamada, et al. "Lighting Device". U.S. Pat. No. 4,914,553.
3. Hinotani, et al. "Flat Fluorescent Lamp for Liquid Crystal Display". U.S. Pat. No. 4,920,298.
4. Shaw. "Compact LCD Luminaire". U.S. Pat. No. 4,974,122.
5. Hathaway, et al. "Faceted Light Pipe". U.S. Pat. No. 5,050,946.
6. Arego, et al. "Backlighting System with Faceted Light Pipes". U.S. Pat. No. 5,202,950.
7. Kalmanash. "Backlight for Liquid Crystal Devices". U.S. Pat. No. 5,211,463.
8. Kalmanash. "Wide Dimming Range Backlight for Liquid Crystal Devices". U.S. Pat. No. 5,442,522.

The present invention is derived from and related to the previous patents of the present inventor, (U.S. Pat. No. # 5,211,463 and U.S. Pat. No. #5,442,522), issued to the assignee of the present invention. These patents describe dual (Day/Night) lighting systems for LCD displays, where a lightpipe is edge-illuminated by a first (Night) light source, typically a cold-cathode fluorescent lamp. The lightpipe is independently rear-illuminated by second source, a set of high intensity lamps (Day lamps), for use in high ambient viewing. Under night viewing, the Day lamps are switched off and the display luminance is provided only by the Night lamp. Under daytime viewing the Day lamps are on and provide most of the display illumination, whether or not the Night lamp is on.

U.S. Pat. No. 5,211,463, in particular, addresses the requirements of Night Vision Imaging System (NVIS) compatibility, important for enhanced night vision in many avionics or surveillance applications. NVIS compatibility requires minimum infrared (IR) and near-IR emission from the display.

For color displays, NVIS compatibility compromises display performance, reducing the light output and the display color gamut by attenuating and desaturating the red spectral output, which is particularly unsatisfactory in high viewing ambients (e.g., bright sunlight). The architecture described in U.S. Pat. No. 5,211,463 incorporates an NVIS filter (to remove the IR) only in the optical path of the Night lamp, thus retaining the full color gamut, high brightness and high efficiency in the Day mode.

SUMMARY OF THE INVENTION

According to the present invention, an integrated fluorescent light source is created from a base block in which tortuous serpentine channels are created for ionized gas to generate UV radiation which is converted by phosphors into visible light. A light transmitting cover plate hermetically seals the top of the base block.

A pattern of diffuse "extractor dots" is added to the inner surface of the cover plate, which is phosphor coated, as well. The phosphor coating improves the light output when the serpentine channel is excited, while the extractor dots permit the cover plate to be edge-illuminated by a discrete cold cathode fluorescent lamp or other luminance source, and to direct light toward the viewer, orthogonal to the cover plate surface in a manner which is largely uniform over the lamp surface.

Other geometries may be employed, for example, the shapes illustrated in my earlier U.S. Pat. Nos. 5,211,463 and 5,442,522, assigned to the assignee of the present invention. In those patents, wedge and double wedge shapes were shown which tended to provide a more uniform illumination across the cover plate.

The serpentine lamp functions as a day lamp, while the other light source functions as a night lamp, for a very wide overall dimming range. The edgelit optical path may, if desired, include an NVIS filter, as is described in U.S. Pat. No. 5,211,463. A principal advantage of this configuration is the elimination of the need for a discrete lightpipe in the backlight "stack", reducing cost and weight and improving the packaging. Alternatively, infra-red absorptive materials could be used to fabricate the cover plate.

Main electrodes are placed in the block at opposite ends of the serpentine light path so that when a source of potential is applied, the low pressure, inert gas contained within the block in the current path becomes ionized and radiates in the ultra violet region of the spectrum.

In alternative embodiments, the block includes at least one isolated side channel in which a separate night light source can be located. The cover plate can be provided with beveled edges overlying the side channel so that the beveled surface acts as a mirror to direct the light to the interior of the plate from where it can be uniformly extracted.

Otherwise, the plate can be provided with flat sides, orthogonal to the faces of the plate and mirrored surfaces can redirect the light emanating from a side channel into the interior of the cover plate. A switch within the power source can alternatively direct power to the day light, the night light or both, if desired.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for purpose of illustration and description only and they are not intended as a definition of the limits of the invention.

DESCRIPTION OF THE PREFERRED EMBODIMENTS

Figure 1:
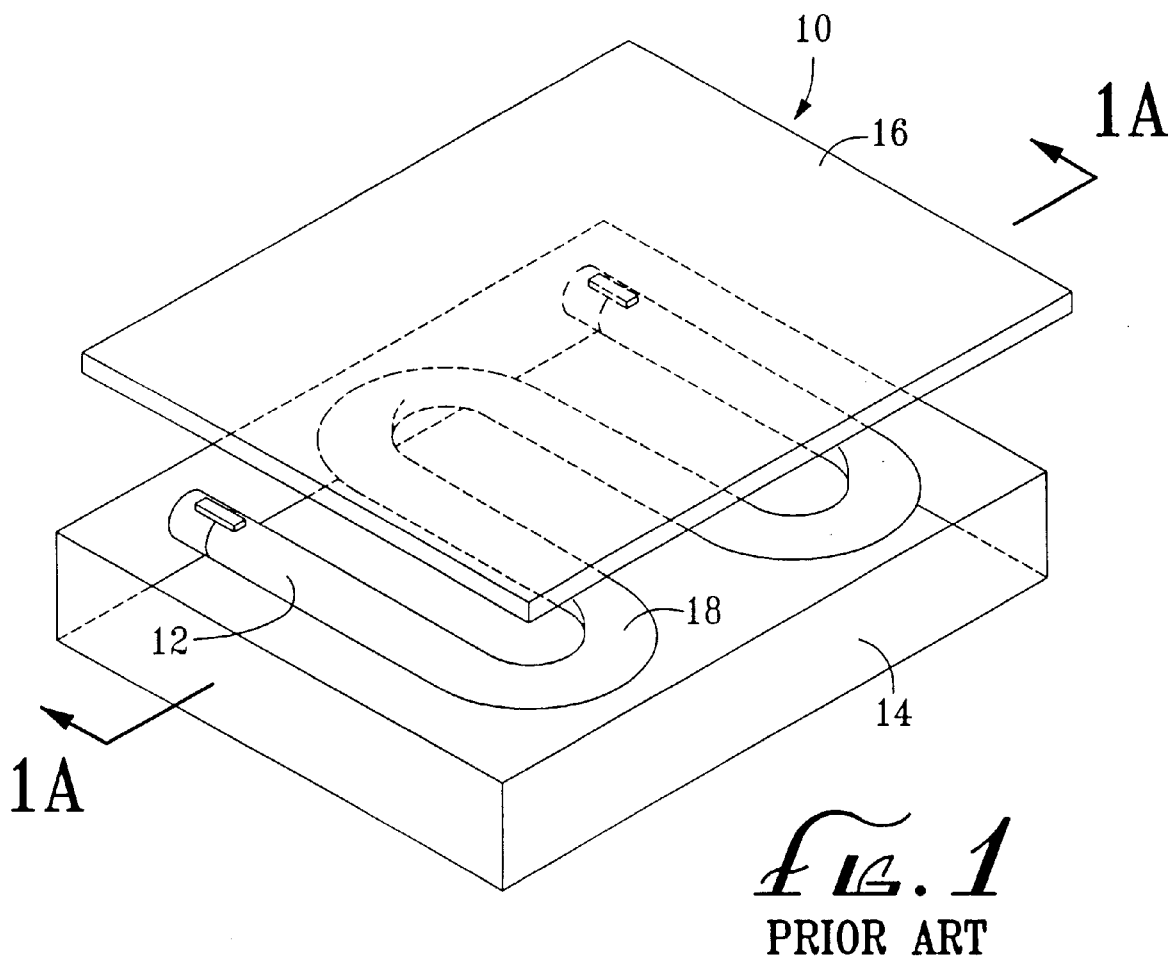
FIG. 1, including
Figure 1A:
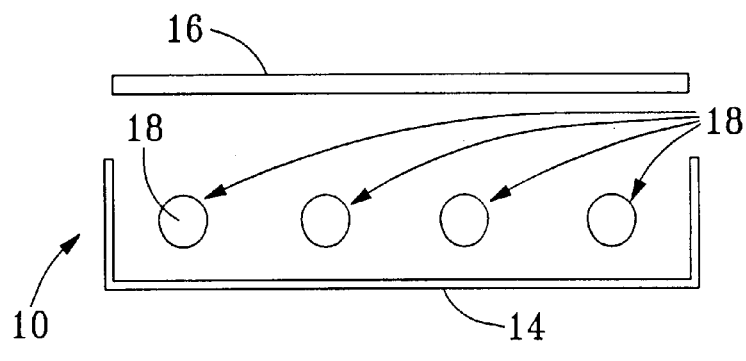
FIG. 1A is a partially exploded perspective view and a sectional side view, respectively, of a prior art serpentine fluorescent back light.

FIGS. 1 and 1A illustrate a conventional serpentine LCD backlight structure 10 such as might be used in an avionics display. It incorporates a serpentine tubular fluorescent lamp 12 mounted in a reflector housing 14 to enhance overall luminous efficiency. The structure 10 also incorporates a diffuser plate 16 to establish the needed backlight uniformity. The diffuser 16 scatters the light rays from the individual lamp legs 18 to create a uniform luminance plane behind the LCD.

Figure 2:
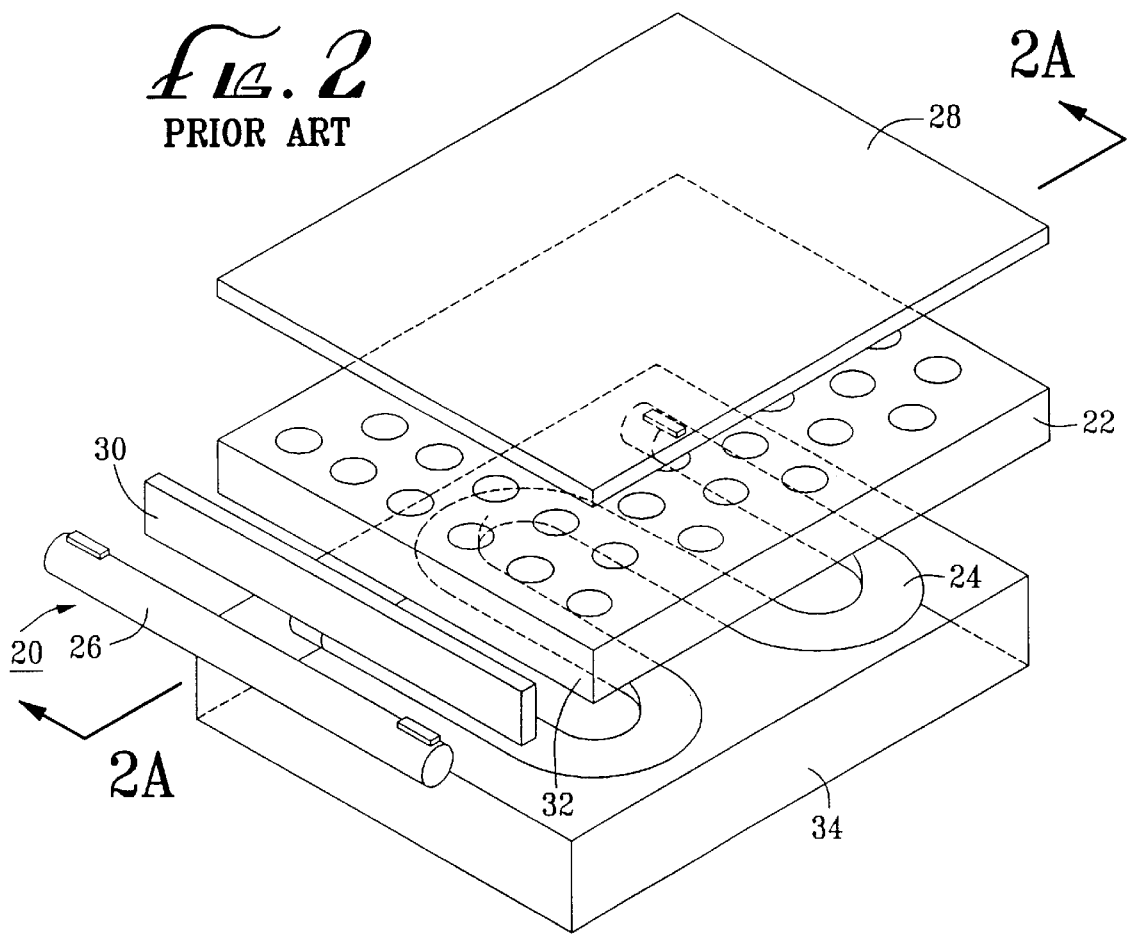
FIG. 2, including
Figure 2A:
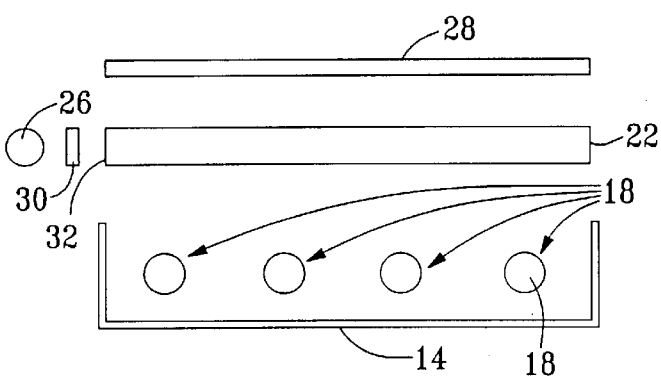
FIG. 2A is a partially exploded perspective view and a sectional side view, respectively, of a prior art serpentine fluorescent back light combined with a separate night lamp.

FIGS. 2 and 2A show a dual-mode lighting system 20 based on the structure described in the referenced patents (U.S. Pat. Nos. 5,211,463 and 5,442,522). A lightpipe 22 is mounted in front of the serpentine lamp structure 24 which is edgelit by a separate (night) lamp 26 to provide lower luminance levels (and/or NVIS compatibility) without affecting high ambient operation.

As with the structure 10 of FIG. 1, a diffuser 28 tends to make the transmitted light more uniform over the area of the lightpipe 22. A night vision filter 30 may interposed between the night lamp 26 and the edge 32 of the lightpipe 22. There are non NVIS applications where a filter need not be employed. As shown, a reflector housing 34 is placed behind the serpentine lamp structure 24 to increase the brightness of the illumination transmitted through the lightpipe 22.

Figure 3:
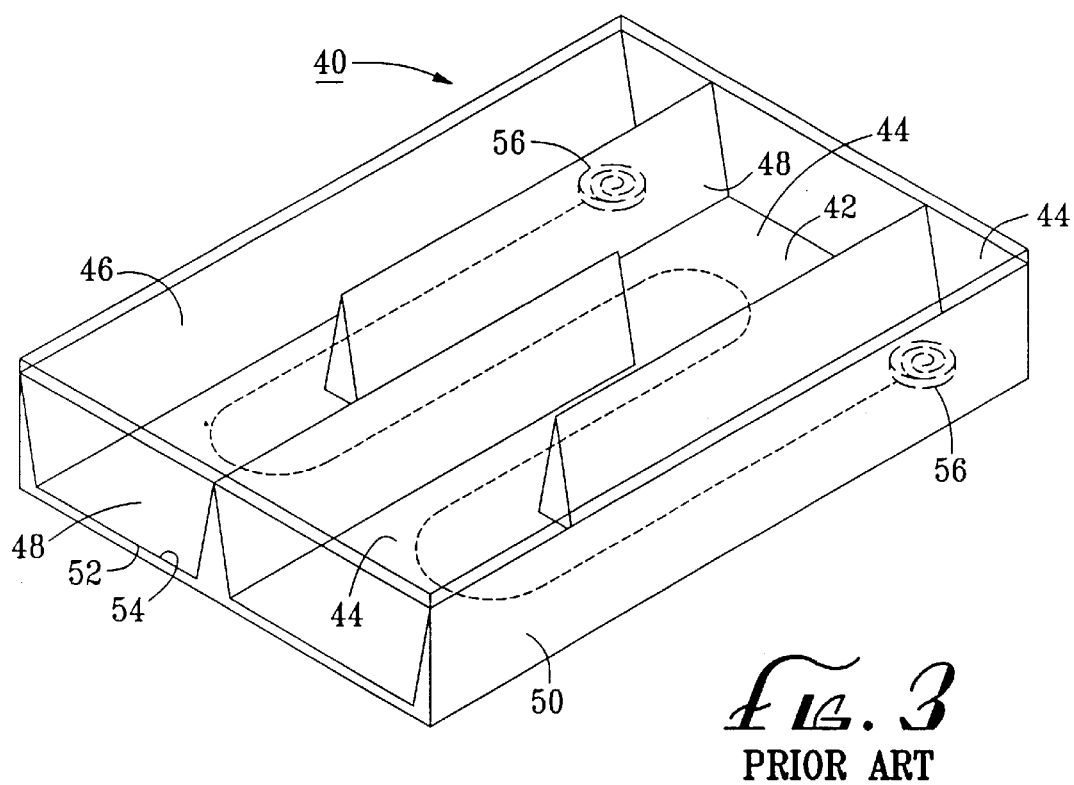
FIG. 3 is a perspective view of the base portion of a prior art flat channel lamp.

FIG. 3 shows a prior art backlight structure 40 alternative to that described in FIG. 1 but using a flat channel fluorescent lamp 42 instead of a serpentine tubular lamp element. The flat channel structure 42 typically permits more legs or channels 44, spaced more closely together than would be possible with serpentine fluorescent tubes, improving uniformity and enabling the use of a more transmissive front substrate diffuser 46 for increased overall efficiency.

The reflector housing function is typically incorporated into the flat channel lamp 40, eliminating the need for a separate element and reducing overall installation depth. In the flat channel lamp 40, the front substrate diffuser 46 is typically a flat piece of glass, which is coated with phosphor 48 on the inside and bonded (frit sealed) to the rear substrate 50 (glass or ceramic), which defines the lamp channel structure.

The inner surface 52 of the rear substrate 50 is coated with a reflective layer 54 and over coated with phosphor 48 to increase lamp light output. The fluorescent gas mixture is contained in the lamp channel 44 and is excited by a pair of main electrodes 56 at the ends of the channel 44.

Figure 4:
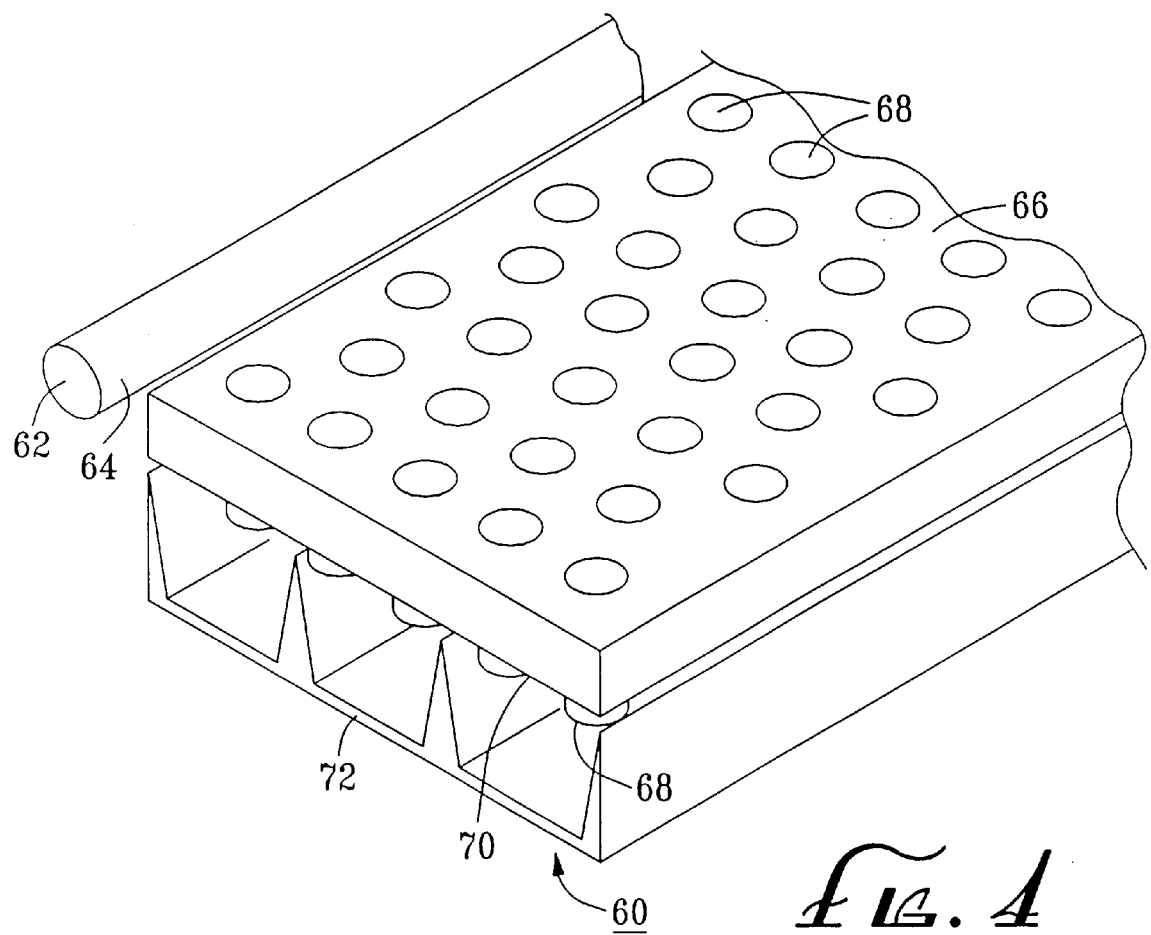
FIG. 4 is a perspective, cut away view of a flat channel lamp with a night lamp according to one embodiment of the present invention.

Turning next to FIG. 4, there is illustrated a simple embodiment of a day-night lamp 60 combining a flat channel lamp 42 with a night lamp 62 and NVIS filter 64 adjacent the front substrate 66 which functions as a light pipe or light plate. The current invention combines the day-night architecture of the above referenced Kalmanash patents with the flat channel fluorescent lamp structure, to enable synergistic gains.

In its simplest embodiment, the invention calls for the functions of the Night lightpipe to be incorporated into the front substrate 66 of the flat channel fluorescent lamp 60 This may be done by adding a pattern of diffuse "extractor dots" 68 to the inner surface 70 of the front lamp substrate 66 to direct the edgelit night mode light rays toward the viewer. The base substrate 72 is phosphor coated, as well, to enhance luminance in the day mode.

In this configuration, the flat channel lamp front substrate 66 is edge-illuminated by the discrete cold cathode fluorescent lamp 62 or other luminance source. The edgelit optical path usually will include an NVIS filter 64 as is described in U.S. Pat. No. 5,211,463. A principal advantage of this configuration is the elimination of the need for a discrete lightpipe in the backlight "stack", thereby reducing cost and weight, and improving the packaging.

Other well-known means of constructing lightpipes might be incorporated into the flat channel lamp front substrate 66 instead of the "extractor dot" architecture. These include faceted structures as described by Hamada, et al (U.S. Pat. No. 4,914,553); by Hathaway, et al. (U.S. Pat. No. 5,050, 946); and by Arego, et al. (U.S. Pat. No. 5,202,950); as well as by wedge-shaped structures as described by Hehr (U.S. Pat. No. 4,277,817) and my prior patents (U.S. Pat. Nos. 5,211,463 and 5,442,522).

According to the present invention, any of these structures might be phosphor-coated and serve as the front substrate of the flat channel lamp. The above structures are cited as examples of lightpipe architectures that might be included in the flat channel lamp. The list is not meant to be inclusive of all possibilities.

Figure 5:
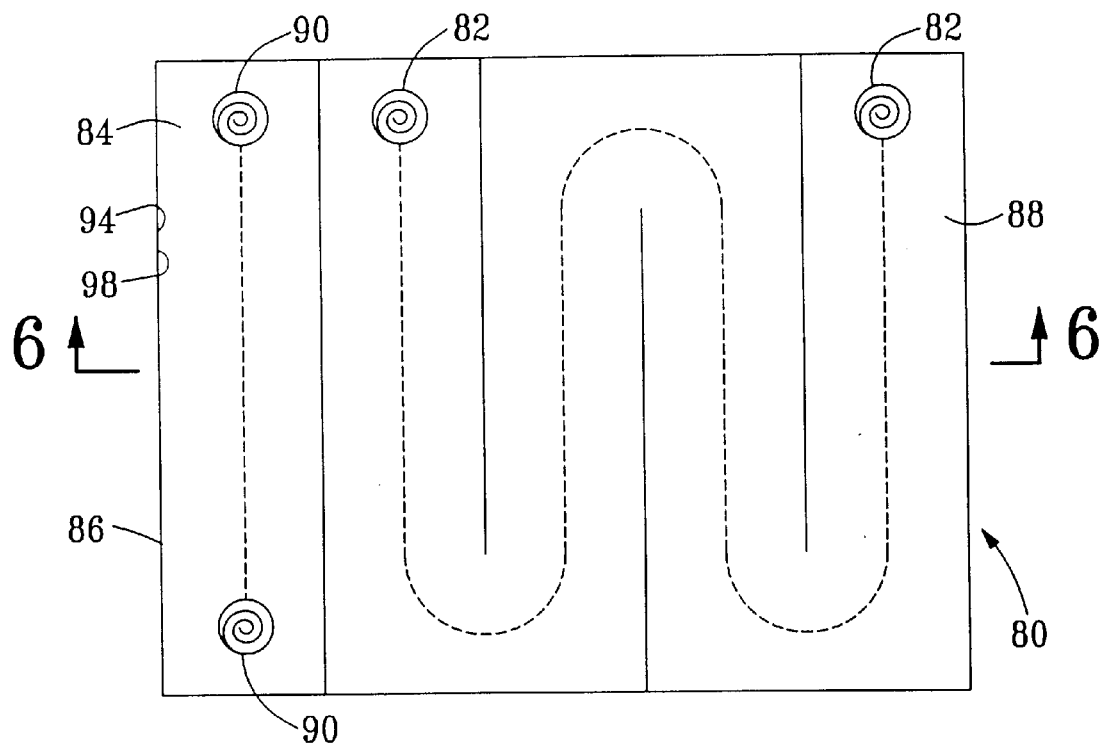
FIG. 5 is a top view of the base portion of a flat channel lamp with an integrated night light.
Figure 6:
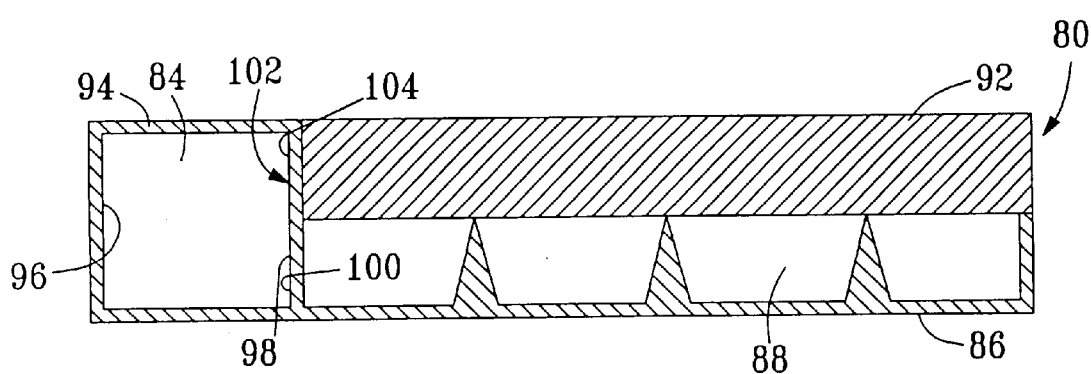
FIG. 6 is a side sectional view of the lamp of FIG. 5, taken along the line 6—6 in the direction of the appended arrows.

In an alternative configuration, described in FIGS. 5 and 6, the night lamp itself is incorporated into a flat channel lamp 80, eliminating the need for a second, discrete lamp altogether and allowing for additional simplification of the overall backlight structure. The day lamp portion is excited by a pair of primary electrodes 82.

As shown, an independent channel 84 is formed in the rear substrate 86 of the flat channel lamp 80 in much the same manner as the serpentine "legs" are formed (whether by etching or molding). This night channel 84 is adjacent the serpentine day channel 88 and is independent in the sense that it is physically and electrically isolated from the multi-leg "day" channel 88.

Its gas mixture is excited by a pair of secondary electrodes 90. The same driver circuits can be used to alternatively excite either the day or night channels, providing extending dimming range and/or NVIS compatibility. It is also possible that both day and night channels could be excited at the same time.

Separate front substrates 92, 94 are used for the day and night channels 88, 84, with day channel front substrate 92 being much thicker night channel front substrate 94. This additional thickness allows the day channel front substrate 94 to be edge illuminated by the night channel 84, via a phosphor coating 96 on the night channel surface 98 abutting the day channel front substrate 92.

Note, according to FIGS. 5 and 6, that all internal surfaces of the night channel are coated with phosphor 96 plus reflective coatings 100, except the surface forming the edge 102 of the day channel front substrate 92. This surface is coated only with phosphor 96. In this way, all the night channel 84 luminance is used to edge-illuminate the day channel front substrate 92.

An IR interference filter 104 on the phosphor-coated surface can provide NVIS filtering, if desired.

Turning next to FIGS. 7 through 10, there are shown alternative, integral embodiments of a flat channel lamp with an integral auxiliary or night light channel in addition to the primary or day light channel which has a serpentine tortuous path.

Figure 7:
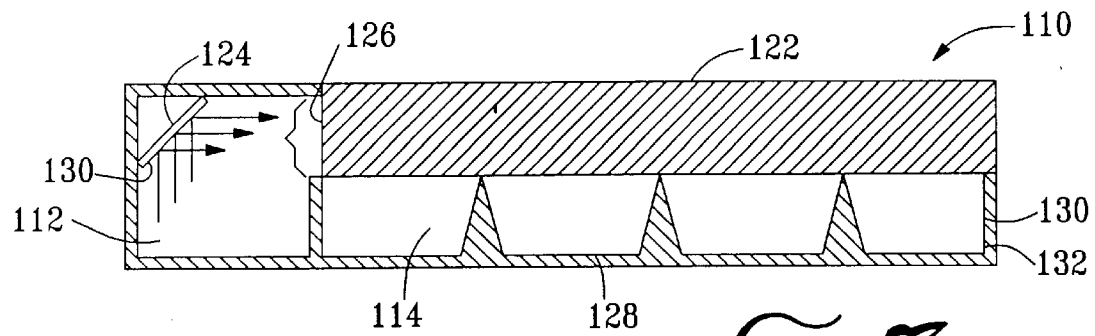
FIG. 7 is a side sectional view of an alternative embodiment of the lamp of FIG. 6.

In FIG. 7 there is shown one approach to the edge lighting of the front light transmitting substrate 122. As shown, a reflective surface 124 is placed in an auxiliary channel 112 to redirect illumination in the forward direction into an edge 126 of the front substrate 122. All of the rear surfaces 128 have a combination of a reflective 130 and phosphor 132 coating to maximize the illumination in the forward direction. The inner surfaces of the front substrate 122 also have a phosphor coating.

The angled reflective surface 124 in the auxiliary night channel 112 is provided with a reflective coating 130. Although the reflective surface 124 is shown as an angled, planar element, it can be appropriately curved to maximize the illumination directed into the edge 126 of the front substrate 122, better seen in FIG. 9.

Figure 8:
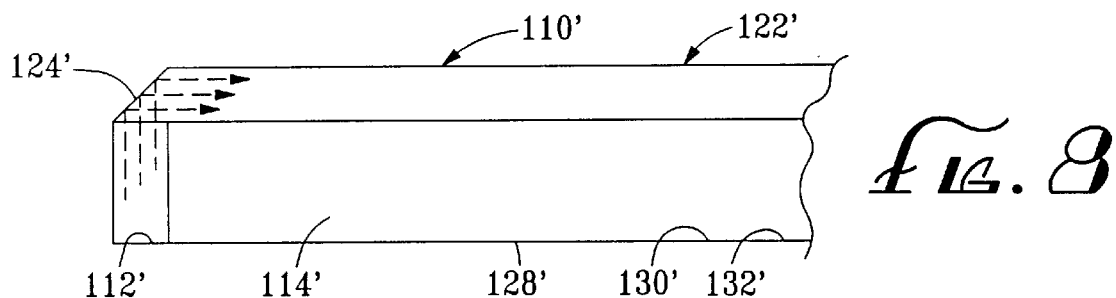
FIG. 8 is a side view of another alternative embodiment of the lamp of FIG. 6.

In FIG. 8, another embodiment of the integral flat channel lamp 110' is shown. In this embodiment, the front substrate 122' extends over the night channel 112' and has an angled or beveled edge 124' overlying the night channel 112', which is coated with a reflective material 130 or has a mirror attached to it. Light generated in the night channel 112' is directed upward and reflects off the angled surface 124' and is redirected to the interior of the front substrate 122'.

Figure 9:
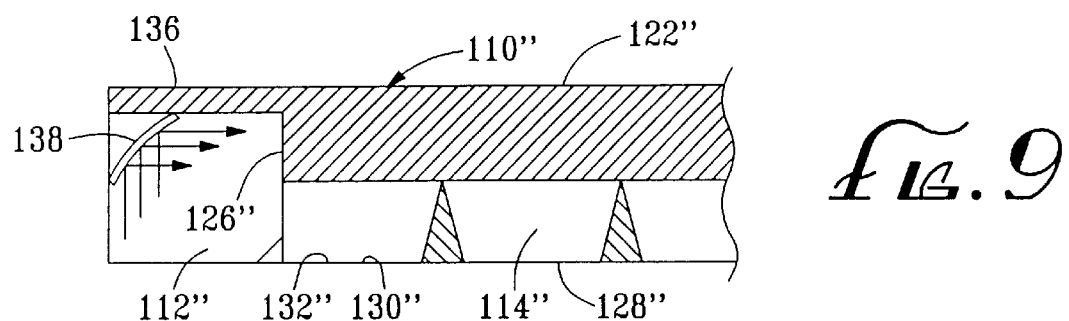
FIG. 9 is a side section view of an alternative embodiment of a lamp.

Another embodiment of a flat channel lamp 110" is shown in FIG. 9. Here, as in FIG. 7, the front substrate 122" has a thinner portion 136 which overlies the night channel 112". A reflective element 138 is placed within the night channel 112" and, as shown, may have a curve to redirect impinging light onto the edge 126" of the front substrate 122".

Figure 10:
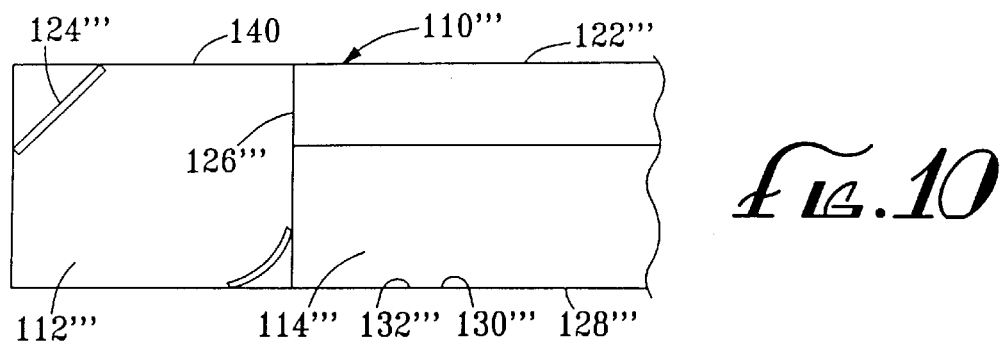
FIG. 10 is a side section view of yet another embodiment of a lamp according to the present invention.

In FIG. 10, there is yet another alternative embodiment of the present invention 110'". Here, a hermetic sealing plate 140 covers the night channel 112'" to keep it air tight. A reflective element 124'" redirects light from the night channel 112'" into the edge 126'" of the front substrate 122'".

Figure 11:
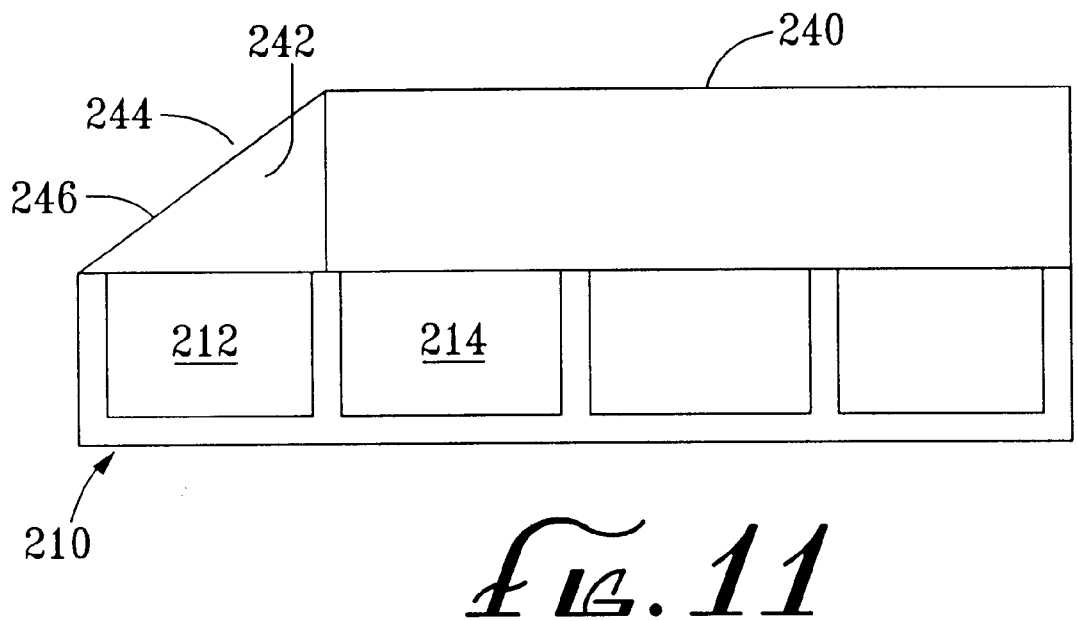
FIG. 11 is a side section view of an embodiment in which the cover plate includes two pieces bonded together.

FIG. 11 shows a variation of a flat channel lamp 210 in which a two part cover plate is used. A first, hermetically sealing cover plate 240 covers the day channel 214 and a separate covering element 242 overlies the night channel 212. The separate covering element 242 is made of a IR absorbing glass such as Hoya CM500. An angled edge 244 has a reflective coating 246 applied to the outer surface 246 so that light created within the interior of the night channel 212 is reflected and redirected into the main day channel cover plate 240. The apparatus of FIG. 11 is particularly useful in NVIS applications.

Figure 12:
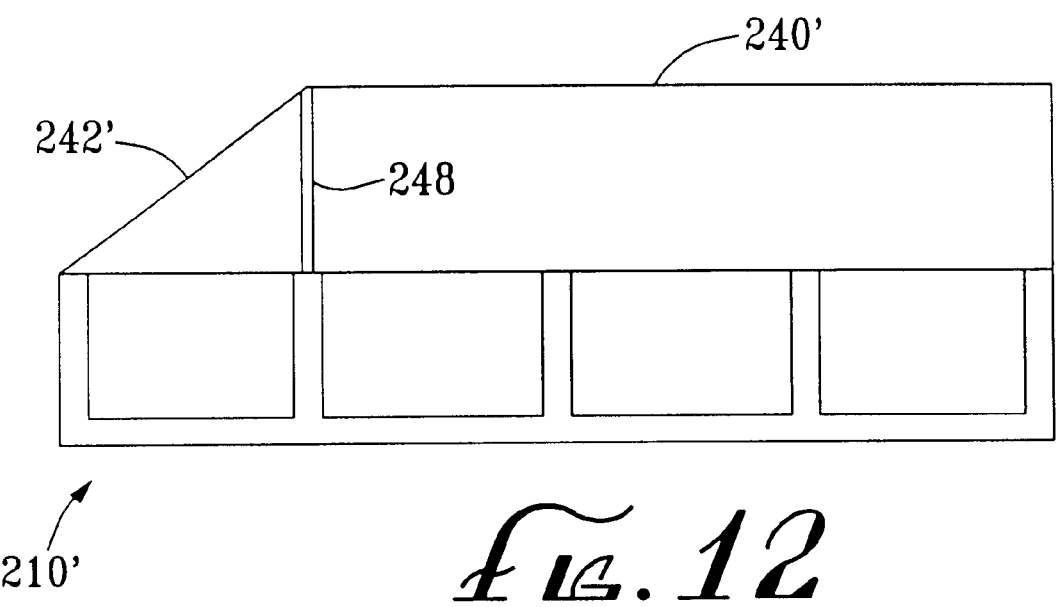
FIG. 12 is a side sectional view of a variation of the embodiment of FIG. 11 in which an infra red reflective layer is applied to the edge of the cover plate.

A variation of the structure of FIG. 11 is shown in FIG. 12. Here, an IR reflective layer 248 is applied to the edges of the cover elements 240' and 242' before they are sealed together. In this embodiment, both cover plate elements 240, 242 can be made of the same material without compromising the NVIS night performance of the dual mode lamp.

Thus there has been shown and described, integral day night backlighting structures with wide range dimming capabilities, suitable for use with NVIS systems. A flat channel backlight is modified with the addition of a night lamp that directs illumination into the edge of the face plate that normally functions to transmit the light generated in the serpentine channels of the display. Various structures can be incorporated in the face plate to redirect the edge light upwards.

In a first embodiment, a separate night lamp is mounted to the edge of the flat channel device. In alternative embodiments, the night lamp can be an additional channel adjacent the main channel with means for redirecting the light generated therefrom into the edge of the face plate. The exterior edge of the cover or face plate can be beveled or curved to provide a reflective surface to the impinging illumination from the additional night channel. It is also possible to construct a reflecting surface within or exterior to the additional channel that can redirect the light into an edge of the face plate.

Accordingly, the breadth of the invention should only be limited by the scope of the claims appended hereto.

What is claimed is:

1. An integrated night-day backlight device comprising:
   a. a base member;
   b. a serpentine main channel in said base member;
   c. a light transmissive plate member overlying said main channel;
   d. means hermetically sealing said plate member to said base member to create a low pressure gaseous environment for producing ultra violet radiation in response to applied electric currents;
   e. phosphors on the interior surfaces of said channel for providing visible light in response to impinging ultra violet radiation;
   f. day electrode means for creating a current through said main channel;
   g. an auxiliary night light channel adjacent said main channel; and
   h. diverting means for directing the light from said night light channel into the interior of said plate member;
   where-by said night light source can provide low level backlight illumination when said main channel is not producing light through said plate member.

2. An integrated night-day backlight device as in claim 1 above, further including filtering means for blocking the passage of any infrared radiation component in the light produced by said night light channel to enable use in NVIS environments.

3. An integrated night-day backlight device as in claim 1 above further including a second light transmissive plate member overlying said auxiliary night light channel and means hermetically sealing said second plate member to said base member to create a low pressure gaseous environment for producing ultra violet radiation in said auxialiary channel in response to applied electric currents, said second plate member abutting said plate member.

4. An integrated night-day backlight device as in claim 3 above, further including infrared filtering means between said plate member and said second plate member whereby light from said auxiliary channel being directed into said plate member is free of infrared components.

5. An integrated night-day backlight device as in claim 3 above, wherein said second plate member has an angled edge adapted to redirect light from said auxiliary channel into the edge of said plate member.

6. An integrated night-day backlight device as in claim 5 above, wherein said second plate member angled edge has a coating of reflecting material to assist in redirecting light into the edge of said plate member.

7. An integrated night-day backlight device as in claim 1 above, wherein said diverting means include reflective elements in said auxiliary channel for directing light into the interior of said plate member.

8. An integrated night-day backlight device as in claim 1 above, wherein said plate member includes means responsive to light entering the interior for redirecting such light through a surface.

9. In a light source including a face plate hermetically sealed to the walls of a base member, the base member having a serpentine channel containing an ionizable low pressure gas sealed therein, the channel having phosphor coating on the interior surfaces thereof for the radiation of visible light in response to excitation by impinging ultra violet radiation, the improvement comprising:
   a. a first, substantially straight channel adjacent the serpentine channel;
   b. phosphors on the interior surfaces of said straight channel for providing visible light in response to impinging ultra violet radiation;
   c. night electrode means at opposite ends of said straight channel; and
   d. means for directing illumination radiating from said straight channel into the interior of said face plate, whereby said straight channel can provide night illumination when the serpentine channel is not being excited.

10. An integrated night-day backlight device as in claim 9 above, wherein the light from said straight channel is directed into an edge of the face plate.

11. An integrated night-day backlight device as in claim 9 above, including filtering means for filtering and blocking infrared components of the straight channel light from entering the face plate whereby the device is compatible with NVIS operation.

12. An integrated night-day backlight device as in claim 9 above, wherein said straight channel includes reflective elements for directing straight channel light into the interior of the face plate.

13. An integrated night-day backlight device as in claim 9 above, further including a second straight channel adjacent the opposite end of the serpentine channel, said night electrode means including electrodes at the opposite ends of said second straight channel.

* * * * *